J. G. WIDMANN.
Umbrellas.
No. 166,439.            Patented Aug. 3, 1875.
Fig. 1.     Fig. 2.     Fig. 3.
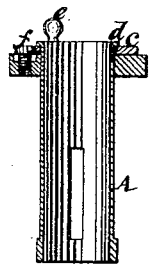
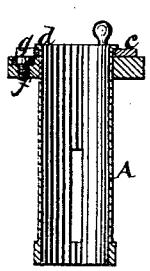
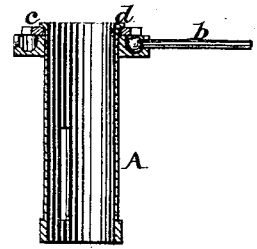
Fig. 9.
Fig. 4.     Fig. 5.     Fig. 6.
Fig. 10.
Fig. 11.
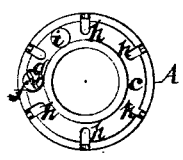
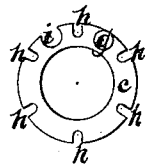
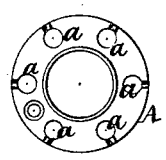
Fig. 7.     Fig. 8.
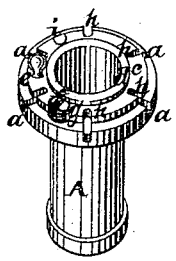
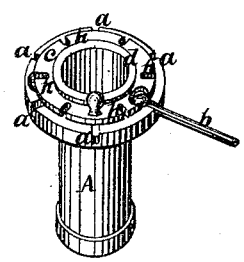
Witnesses.
Otto Hufeland
Chas Wahlen
Inventor,
John George Widmann
pr
Van Santvoord & Hauff
Attrs

UNITED STATES PATENT OFFICE.

JOHN GEORGE WIDMANN, OF YONKERS, NEW YORK.

IMPROVEMENT IN UMBRELLAS.

Specification forming part of Letters Patent No. 166,439, dated August 3, 1875; application filed April 9, 1875.

*To all whom it may concern:*

Be it known that I, JOHN GEORGE WIDMANN, of Yonkers, in the county of Westchester and State of New York, have invented a certain new and useful Improvement in Umbrellas and Parasols, of which the following is a specification:

This invention is illustrated in the accompanying drawing, in which—

Figure 1 represents a longitudinal central section of the runner for an umbrella constructed according to my invention, the locking-disk being closed. Fig. 2 is a similar section when the locking-disk is open. Fig. 3 is a similar section, showing one of the stretchers secured in the runner. Fig. 4 is a plan or top view of the same. Fig. 5 is a plan of the locking-disk detached. Fig. 6 is a plan of the runner detached. Fig. 7 is a perspective view of the runner with the locking-plate closed. Fig. 8 is a similar view of the same when the locking-plate is open.

Similar letters indicate corresponding parts.

This invention consists in the combination of a locking-disk and stop with the runner or crown, and with the stretchers or ribs of an umbrella or parasol, so that, by turning said disk in the proper position, the stretchers or ribs are retained in their sockets in the runners or crown, and, by turning the disk to other positions, either of the stretchers or ribs can be removed from or inserted in the appropriate socket in the runner or crown.

In the drawing, the letter A designates the runner of an umbrella or parasol, which is provided with a series of pear-shaped sockets, *a*, (best seen in Fig. 6,) for the reception of the enlarged ends of the stretchers *b*. These ends are either provided with globe-shaped heads or with cross-bars, or with simple hooks, and sockets *a* are formed to correspond to the enlargements on the ends of the stretchers. On the head of the runner is fitted a disk, *c*, which is retained between said head and a flange or lip, *d*, (see Figs. 1, 2, and 3,) and which is provided with a button or finger-piece, *e*, so that it can be freely turned round in either direction. In the head of the runner is secured a stop, *f*, which is inserted through an opening, *g*, in the disk, Figs. 5 and 7, and screws into the head of the runner, so that it can be screwed in or out. If it is screwed in so as to be flush with the outer surface of the head the disk can be freely turned round; but, if it is screwed out so that it projects beyond the surface of the head into the hole *g* of the disk, said disk is locked.

In the disk are a series of recesses, *h*, just large enough to admit the bodies of the stretchers, and one large recess, *i*, of such a size that it will admit the heads or enlarged ends of said stretchers.

When the stop *f* of the runner extends through the hole *g* in the locking-disk the recesses *h* correspond to the sockets *a* in the runner, and the stretchers previously laid into said sockets are retained in position, being free, however, to swing up and down. When the stop *f* is screwed in, so as to release the locking-disk, the large recess *i* in this disk can be turned over either of the sockets *a* in the runner, and the corresponding stretcher can be taken out or inserted, as the case may be, without disturbing either of the remaining stretchers.

It is obvious that my invention is also applicable to the crown of an umbrella or parasol in which the ends of the ribs are retained.

By this arrangement the operation of inserting the ribs or stretchers in the crown or runner is materially facilitated; and, if one of said ribs or stretchers becomes defective, it can be readily removed and replaced by another without disturbing either of the remaining ribs or stretchers. The enlargements required at the ends of the ribs or stretchers can easily be produced by suitable machinery; and said enlargements may either be globe-shaped, as shown in Fig. 9, or in the form of a cross-bar, as shown in Fig. 10, or in the form of a simple hook, as shown in Fig. 11.

What I claim as new, and desire to secure by Letters Patent, is—

1. The combination, with the runner of an umbrella having a notched crown-piece, of a notched disk upon the runner, constructed and arranged to operate substantially as and for the purposes described.

2. The combination, with the runner of an umbrella having a notched head, lateral flange or lip $d$, and a lock or stop, $f$, of the notched disk C, secured between the said flange $d$ and the notched head, and having a finger-piece, $e$, and recess $i$, substantially as described.

In testimony that I claim the foregoing I have hereunto set my hand and seal this 5th day of April, 1875.

JOHN GEORGE WIDMANN. [L. S.]

Witnesses:
W. HAUFF,
E. F. KASTENHUBER.